(12) United States Patent
Matusz

(10) Patent No.: US 7,551,607 B2
(45) Date of Patent: Jun. 23, 2009

(54) PACKET TRAFFIC MANAGEMENT APPARATUS, SYSTEMS, AND METHODS

(75) Inventor: Pawel Oskar Matusz, Rumia (PL)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 11/082,368

(22) Filed: Mar. 16, 2005

(65) Prior Publication Data

US 2006/0209790 A1 Sep. 21, 2006

(51) Int. Cl.
*H04L 12/66* (2006.01)
(52) U.S. Cl. .......................... 370/352; 455/509
(58) Field of Classification Search ............. 370/352; 455/509

See application file for complete search history.

(56) References Cited

U.S. PATENT DOCUMENTS

| | | | |
|---|---|---|---|
| 6,757,319 B1 * | 6/2004 | Parsa et al. | 375/141 |
| 6,917,613 B1 * | 7/2005 | Tiburtius et al. | 370/353 |
| 7,020,144 B2 * | 3/2006 | Chang | 370/395.6 |
| 7,191,231 B2 * | 3/2007 | Miernik et al. | 709/225 |
| 2002/0102962 A1 * | 8/2002 | Grinn et al. | 455/406 |
| 2002/0141395 A1 * | 10/2002 | Chang | 370/355 |
| 2002/0142753 A1 * | 10/2002 | Pecen et al. | 455/411 |
| 2002/0142805 A1 * | 10/2002 | Pecen et al. | 455/558 |

* cited by examiner

*Primary Examiner*—Creighton Smith
(74) *Attorney, Agent, or Firm*—Schwegman, Lundberg & Woessner, P.A.

(57) ABSTRACT

Apparatus and systems, as well as methods and articles, may operate to receive a packet on a circuit-switched channel in a wireless network, detect that a transmission window associated with the circuit-switched channel is closed, and divert the packet from the circuit-switched channel to a packet-switched channel.

21 Claims, 3 Drawing Sheets

PACKET TRAFFIC MANAGEMENT APPARATUS, SYSTEMS, AND METHODS

TECHNICAL FIELD

Various embodiments described herein relate to wireless communication technology generally, including apparatus, systems, and methods used in allocating channels and scheduling packets for transmission over a network.

BACKGROUND INFORMATION

Some wireless networks, including a universal mobile telecommunications system (UMTS) network, may segment packet traffic, including voice packets, into a circuit-switched domain and a packet-switched domain. Some networks may attempt to improve bandwidth allocated to time-sensitive voice packets by dedicating certain circuit-switched channels to their delivery. Since the number of these dedicated channels may be limited, however, such networks may also impose substantially strict timing requirements on the voice packets, particularly on the downlink side of a circuit. Thus, packets arriving at a base station from the network outside of a predefined timing window (due to jitter, frame delay, or re-synchronization delays, for example) may not be forwarded across the radio interface to the subscriber; they may even be dropped. This situation may negatively impact voice quality perceived by a subscriber. For additional information regarding the UMTS, please refer to an index of reports located on the UMTS Forum website at http://www.umts-forum.org/servlet/dycon/ztumts/umts/Live/en/umts/Resources_Reports_index.

DETAILED DESCRIPTION

Figure 1:
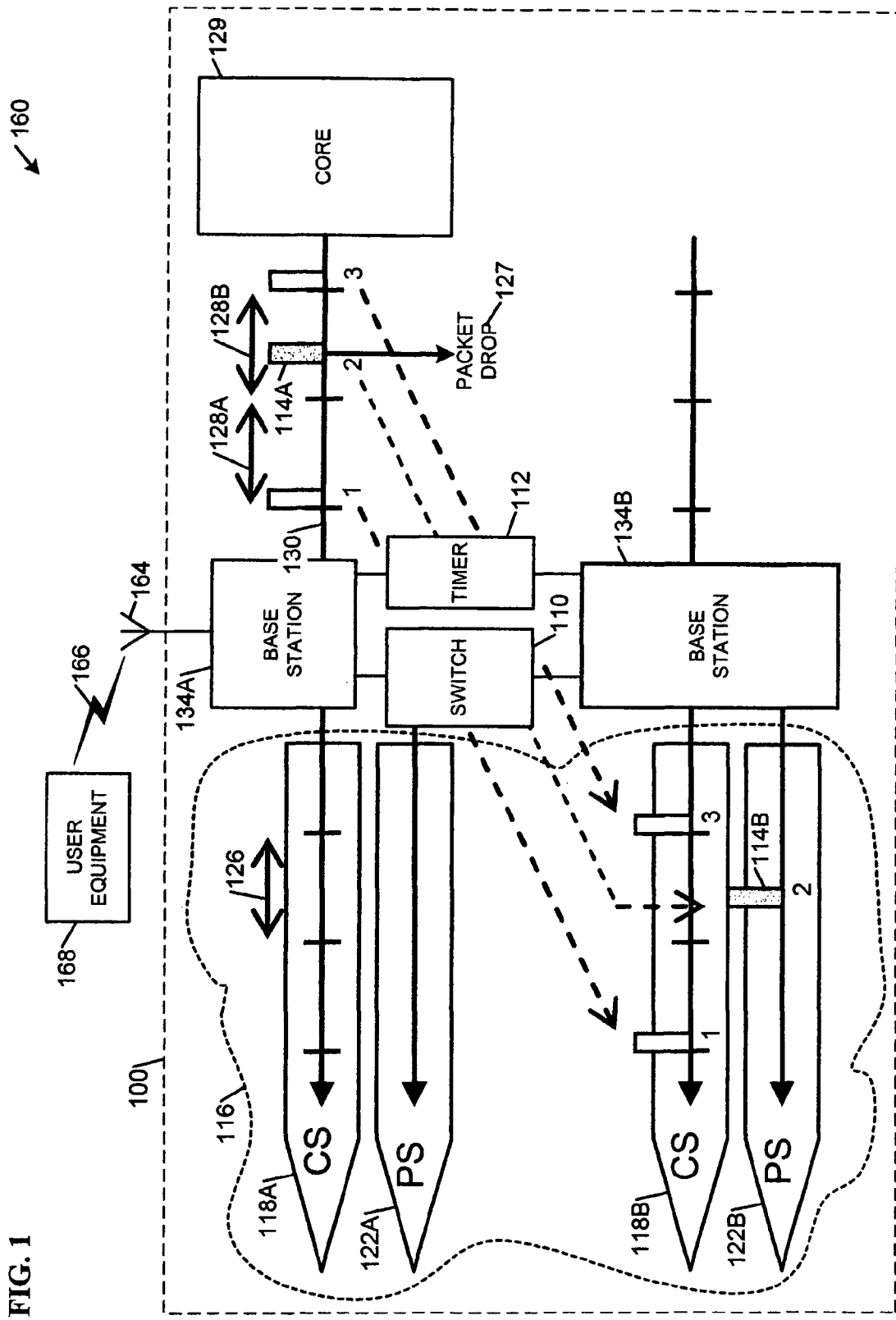
FIG. 1 is a block diagram of apparatus and systems according to various embodiments of the invention.

FIG. 1 comprises a block diagram of an apparatus 100 and a system 160 according to various embodiments of the invention, which may operate to increase an average bandwidth available to time-sensitive voice packets traversing a wireless network. In some embodiments, a voice packet arriving at a base station too late for transmission on a downlink channel with strict timing requirements may be diverted to a channel with less stringent timing requirements, perhaps thus avoiding dropping the packet. Thus, an apparatus 100 may include one or more packet synchronization switches 110, perhaps comprising components of a UMTS radio network controller (RNC).

The packet synchronization switch 110 may operate to divert a packet 114A, 114B (where packet 114B comprises a diverted version of packet 114A) from a circuit-switched channel 118A, 118B to a packet-switched channel 122A, 122B in a wireless network 116 at the time a transmission window 126 associated with the circuit-switched channel 118A, 118B is closed. The apparatus 100 may also include a timer 112 to open and close the transmission window 126.

Diversion may be used to prevent packet drop 127, for example, when an RNC imposes packet slot periodicity 128A, 128B on the packet 114A, 114B (including e.g., a voice packet) arriving at the RNC from a core network 129 for transmission on a downlink 130. Thus, the packet synchronization switch 110 may be operable to switch the packet 114A, 114B to an alternate channel on the downlink 130.

The apparatus 100 may also include one or more base stations 134A, 134B to couple to the packet synchronization switch 110 to transmit the packet 114A, 114B across the packet-switched channel 122A, 122B. The base stations 134A, 134B may comprise UMTS base stations, among other types and technologies, including a UMTS terrestrial radio access network node-B, an RNC, or both.

Other embodiments may be realized. For example, a system 160 may include one or more of the apparatus 100, including a packet synchronization switch 110 to divert a packet 114A, 114B from a circuit-switched channel 118A, 118B to a packet-switched channel 122A, 122B in a wireless network 116 at a time when the transmission window 126 associated with the circuit-switched channel 118A, 118B is closed, as previously described. In some embodiments of the system 160, the transmission window 126 may recur repetitively, e.g., at about 20 millisecond transmission time intervals. A timer 112 may be used to open and close the transmission window 126.

The system 160 may also include one or more base stations 134A, 134B to couple to the packet synchronization switch 110. The system 160 may further include an antenna 164, including perhaps a patch, omnidirectional, beam, monopole, dipole, or rhombic antenna, among others, coupled to the base stations 134A, 134B. The system 160 may also include user equipment 168 (e.g., a wireless mobile device) to couple to the base station 134A, 134B to receive the packet 114A, 114B on the packet-switched channel 122A, 122B. In some embodiments of the system 160, a wideband code-division multiple-access (CDMA) radio link 166 may operate to couple the antenna 164 to the user equipment 168. The packet-switched channel 122A, 122B may comprise a UMTS common-shared channel.

Any of the components previously described can be implemented in a number of ways, including simulation via software. Thus, the apparatus 100; packet synchronization switch 110; packets 114A, 114B; circuit-switched channels 118A, 118B; packet-switched channels 122A, 122B; transmission window 126; packet drop 127; packet slot periodicity 128A, 128B; core network 129; downlink 130; base stations 134A, 134B; system 160; omnidirectional antenna 164; radio link 166; and user equipment 168 may all be characterized as "modules" herein. The modules may include hardware circuitry, single or multi-processor circuits, memory circuits, software program modules and objects, firmware, and combinations thereof, as desired by the architect of the apparatus 100 and system 160 and as appropriate for particular implementations of various embodiments. The modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. Such simulations may be used to characterize or test the embodiments, for example.

It should also be understood that the apparatus and systems of various embodiments can be used in applications other than diverting late-arriving packets in a wireless network to prevent packet loss. Thus, various embodiments of the invention are not to be so limited. The illustrations of apparatus 100 and system 160 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 2:
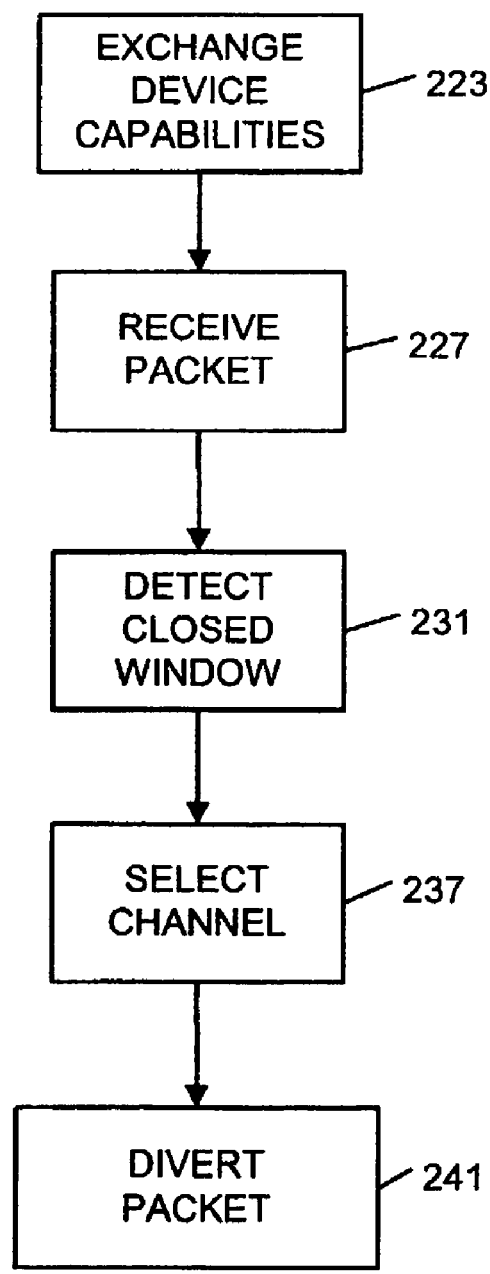
FIG. 2 is a flow diagram illustrating several methods according to various embodiments of the invention.

Some embodiments may include a number of methods. For example, FIG. 2 is a flow diagram illustrating several methods 211 according to various embodiments of the invention. One such method 211 may begin at block 223 with exchanging device capabilities (e.g., handshaking) between wireless mobile telecommunication system devices, including UMTS devices, to enable backward compatibility for devices not supporting packet diversion. Thus, two such devices may implement packet diversion if each determines that that other is diversion-capable during a handshake operation.

The method 211 may continue at block 227 with receiving a packet, including perhaps a voice packet, on a circuit-switched channel in a wireless network. The wireless network may comprise a UMTS network, a global system for mobile communications (GSM) network, an international mobile telecommunications-2000 (IMT-2000) network, and a hiperlan network (high performance radio local area network), among others. In some networks, the circuit switched channel may comprise a dedicated channel. Additional information regarding GSM/GPRS is currently available from the GSM Association website, at http://www.gsmworld.com/technology/gprs/index.shtml. For more information regarding International Telecommunications Union (ITU) standards involving IMT-2000, please see the ITU website at http://www.itu.int/home/imt.html. For more information about hiperlan networks, including applicable standards, please refer to the European Telecommunications Standards Institute website at http://www.etsi.org/services_products/freestandard/home.htm.

The method 211 may also include detecting that a transmission window associated with the circuit-switched channel is closed, at block 231, and selecting a packet-switched channel to which the packet for priority scheduling is to be diverted, at block 237. The packet-switched channel may comprise a random-access channel, a forward-access channel, a downlink shared channel, a high-speed downlink shared channel, an uplink shared channel, a common packet channel, or a packet-switched dedicated channel, for example. For further information concerning these types of channels, please refer to the previously-cited reference on UMTS. The method 211 may further include diverting the packet from the circuit-switched channel to the packet-switched channel at block 241.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Figure 3:
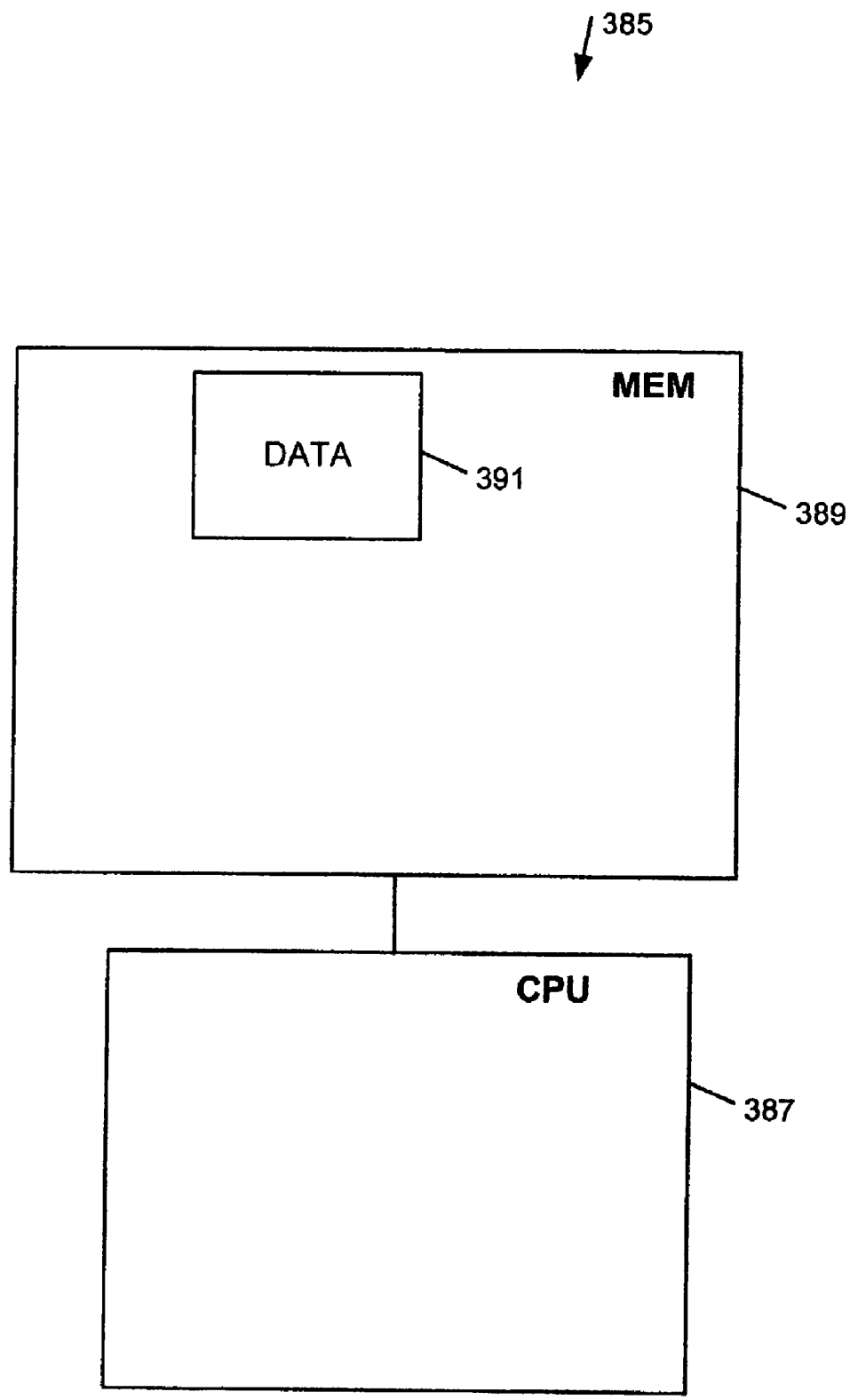
FIG. 3 is a block diagram of an article according to various embodiments of the invention.

Thus, other embodiments may be realized. For example, FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including an electrical, optical, or electromagnetic conductor). The medium may contain associated information 391 (e.g., computer program instructions, data, or both) which, when accessed, results in a machine (e.g., the processor(s) 387) receiving a packet on a circuit-switched channel in a wireless network.

Other activities may include detecting that a transmission window associated with the circuit-switched channel is closed, and diverting the packet from the circuit-switched channel to a packet-switched channel. Further activities may include selecting the packet-switched channel to assure priority scheduling of the packet, and exchanging device capabilities between UMTS devices to enable backward compatibility for devices not supporting the packet diversion.

Implementing the apparatus, systems, and methods disclosed herein may operate to increase the average bandwidth available to timing-sensitive voice packets traversing a wireless network. In some embodiments, a late-arriving voice packet may be diverted to a channel with less stringent timing requirements, perhaps preventing packet drop.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
    a packet synchronization switch to divert a packet from a circuit-switched channel to a packet-switched channel in a wireless network at a time when a transmission window associated with the circuit-switched channel is closed; and
    a timer to open and close the transmission window.

2. The apparatus of claim 1, further including:
    a base station to couple to the packet synchronization switch to transmit the packet across the packet-switched channel.

3. The apparatus of claim 2, wherein the base station comprises a universal mobile telecommunications system (UMTS) base station.

4. The apparatus of claim 3, wherein the UMTS base station comprises a UMTS terrestrial radio access network node-B.

5. The apparatus of claim 1, wherein the packet synchronization switch is operable to switch a voice packet to an alternate channel on a downlink side of the wireless network.

6. The apparatus of claim 1, wherein the packet synchronization switch comprises a component of a universal mobile telecommunications system radio network controller (RNC).

7. The apparatus of claim 6, wherein the RNC imposes about a 20 millisecond packet slot periodicity on a voice packet arriving at the RNC from a core network for transmission on a downlink.

8. A system, including:
    a packet synchronization switch to divert a packet from a circuit-switched channel to a packet-switched channel in a wireless network at a time when a transmission window associated with the circuit-switched channel is closed;
    a timer to open and close the transmission window;
    a base station to couple to the packet synchronization switch; and
    an omnidirectional antenna coupled to the base station.

9. The system of claim 8, wherein the transmission window recurs at about 20 millisecond transmission time intervals.

10. The system of claim 8, further including:
    user equipment to couple to the base station to receive the packet on the packet-switched channel.

11. The system of claim 10, further including:
    a wideband code-division multiple-access radio link to couple the user equipment to the omnidirectional antenna.

12. The system of claim 8, wherein the packet-switched channel comprises a universal mobile telecommunications system common-shared channel.

13. A method, including:
    receiving a packet on a circuit-switched channel in a wireless network;
    detecting that a transmission window associated with the circuit-switched channel is closed; and
    diverting the packet from the circuit-switched channel to a packet-switched channel.

14. The method of claim 13, wherein the packet comprises a voice packet.

15. The method of claim 13, wherein the wireless network comprises at least one of a universal mobile telecommunications system network, a Global System for Mobile communications (GSM) network, an international mobile telecommunications-2000 network, and a hiperlan network.

16. The method of claim 13, wherein the circuit-switched channel comprises a dedicated channel.

17. The method of claim 13, wherein the packet-switched channel comprises at least one of a random-access channel, a forward-access channel, a downlink shared channel, a high-speed downlink shared channel, an uplink shared channel, a common packet channel, and a packet-switched dedicated channel.

18. The method of claim 13, further including:
    exchanging device capabilities between universal mobile telecommunications system devices to enable backward compatibility for devices not supporting the packet diversion.

19. An article including a machine-accessible medium having associated information, wherein the information, when accessed, results in a machine performing:
    receiving a packet on a circuit-switched channel in a wireless network;
    detecting that a transmission window associated with the circuit-switched channel is closed; and
    diverting the packet from the circuit-switched channel to a packet-switched channel.

20. The article of claim 19, wherein the information, when accessed, results in a machine performing:
    selecting the packet-switched channel to assure priority scheduling of the packet.

21. The article of claim 19, wherein the information, when accessed, results in a machine performing:
    exchanging device capabilities between universal mobile telecommunications system devices to enable backward compatibility for devices not supporting the packet diversion.

* * * * *